(12) United States Patent
Bair

(10) Patent No.: US 7,529,750 B2
(45) Date of Patent: May 5, 2009

(54) ACCESSING INFORMATION ON A NETWORK

(75) Inventor: Kevin D. Bair, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 09/733,429

(22) Filed: Dec. 8, 2000

(65) Prior Publication Data
US 2002/0073083 A1    Jun. 13, 2002

Related U.S. Application Data

(60) Provisional application No. 60/224,927, filed on Aug. 11, 2000.

(51) Int. Cl.
G06F 17/30    (2006.01)
(52) U.S. Cl. .................. 707/10; 707/3; 707/4; 707/102
(58) Field of Classification Search .............. 707/1–10, 707/100–103; 709/217–219
See application file for complete search history.

(56) References Cited

U.S. PATENT DOCUMENTS

| | | | | |
|---|---|---|---|---|
| 5,452,450 | A | * | 9/1995 | Delory ........................ 707/10 |
| 5,659,732 | A | * | 8/1997 | Kirsch .......................... 707/4 |
| 5,809,495 | A | * | 9/1998 | Loaiza ........................ 707/10 |
| 5,859,971 | A | * | 1/1999 | Bittinger et al. ............. 709/203 |
| 5,884,312 | A | * | 3/1999 | Dustan et al. .................. 707/10 |
| 5,918,229 | A | * | 6/1999 | Davis et al. ................... 705/26 |
| 5,933,837 | A | * | 8/1999 | Kung ............................ 707/1 |
| 5,983,267 | A | * | 11/1999 | Shklar et al. .................. 707/10 |
| 5,987,463 | A | * | 11/1999 | Draaijer et al. ................ 707/10 |
| 5,987,506 | A | * | 11/1999 | Carter et al. .................. 707/10 |

(Continued)

FOREIGN PATENT DOCUMENTS

JP    09305474    11/1997

(Continued)

OTHER PUBLICATIONS

"Application of Network Database in Automatic Meter Reading", Chen Yii Yen, et al. Monthly Journal of Taipower's Engineering, vol. 610, Jun. 1999, (Abstract).

(Continued)

*Primary Examiner*—Don Wong
*Assistant Examiner*—Hanh B Thai
(74) *Attorney, Agent, or Firm*—Sawyer Law Group LLP

(57) ABSTRACT

A method for accessing information on a network is disclosed. The network comprises a first system and a second system. The method comprises allowing the first system to submit a query to the second system, processing the query with the second system, wherein the second system utilizes information not residing on the second system to process the query and utilizing the second system to return a result of the processed query to the first system. Through the use of the method in accordance with the present invention, the more traditional function of the server database, which is a data storage and access facility, is decoupled from the database engine. Consequently, the server system only acts on data that it is provided access to via a system that is connected to the server system. Accordingly, no information concerning the database (i.e. data or metadata) exists on the server system.

12 Claims, 4 Drawing Sheets

U.S. PATENT DOCUMENTS

| | | | |
|---|---|---|---|
| 6,049,877 A * | 4/2000 | White | 713/172 |
| 6,078,866 A * | 6/2000 | Buck et al. | 702/2 |
| 6,198,824 B1 * | 3/2001 | Shambroom | 380/279 |
| 6,236,997 B1 * | 5/2001 | Bodamer et al. | 707/10 |
| 6,240,416 B1 * | 5/2001 | Immon et al. | 707/10 |
| 6,292,827 B1 * | 9/2001 | Raz | 709/217 |
| 6,292,832 B1 * | 9/2001 | Shah et al. | 709/223 |
| 6,351,776 B1 * | 2/2002 | O'Brien et al. | 709/245 |
| 6,351,846 B1 * | 2/2002 | Collin et al. | 717/125 |
| 6,662,174 B2 * | 12/2003 | Shah et al. | 707/2 |
| 6,954,758 B1 * | 10/2005 | O'Flaherty | 707/102 |
| 6,973,455 B1 * | 12/2005 | Vahalia et al. | 707/8 |
| 7,043,485 B2 * | 5/2006 | Manley et al. | 707/100 |
| 7,111,243 B1 * | 9/2006 | Ballard et al. | 715/744 |
| 7,379,965 B2 * | 5/2008 | Sherwood et al. | 709/203 |
| 2005/0204063 A1 * | 9/2005 | O'Brien et al. | 709/245 |

FOREIGN PATENT DOCUMENTS

| | | |
|---|---|---|
| WO | WO 97/15018 | 4/1997 |
| WO | WO9719415 | 5/1997 |
| WO | WO 99/01802 | 1/1999 |

OTHER PUBLICATIONS

Daniel, Ron Jr. et al., A Metadata Architecture for Digital Libraries: available @ http://www.cs.cornell.edu/logoze/papers/ADL_98/dar-adl.html,; last accessed May 5, 2006.

Logoze, Carl et al., Defining Collections in Distributed Digital Libraries: available @ http://www.dlib.org/dlib/november_98/lagoze/11lagoze.html; last accessed May 5, 2006.

* cited by examiner

ACCESSING INFORMATION ON A NETWORK

This application claims the benefit of U.S. Provisional Application No. 60/224,927 filed on Aug. 11, 2000.

FIELD OF THE INVENTION

The present invention relates to database management systems and more particularly to a method and system for accessing information on a network.

BACKGROUND OF THE INVENTION

Computer networking systems such as the Internet are exploding in popularity all over the world. The Internet is a publicly available network of computer networks that spans, not only the United States, but many parts of the world as well. FIG. 1 is an illustration of a typical Internet environment. This environment includes a network 10, such as the Internet, that is connected to a plurality of client computer systems 12, each of the plurality of client computer systems including a display device for displaying information. Also connected to the network 10 is a plurality of server systems 14 that provide information to the network 10.

Traditional Relational Database Management Systems (RDBMS) maintain metadata about objects such as tables, users, triggers, indexes, etc., in order to effectively store and access data that is maintained by a server database. By managing these objects locally at the server database, additional complexity is added when accessed by a client machine. In addition, application developers must typically purchase a database to test and develop their database applications. This requires the developer to install and maintain the code that is desired. Furthermore, oftentimes in a network, the client machine is more reliable than the server database but since data and metadata reside on the server database, the access to and reliability of the data is lower.

Accordingly, what is needed is a system and method that overcomes the above-mentioned problems. The method and system should be simple, cost effective and capable of being easily adapted to current technology. The present invention addresses such a need.

SUMMARY OF THE INVENTION

A method and system for accessing information on a network is disclosed. The network comprises a first system and a second system. The method and system comprise allowing the first system to submit a query to the second system, processing the query with the second system, wherein the second system utilizes information not residing on the second system to process the query and utilizing the second system to return a result of the processed query to the first system.

Through the use of the method and system in accordance with the present invention, the more traditional function of the server database, which is a data storage and access facility, is decoupled from the database engine. Consequently, the server system only acts on data that it is provided access to via a system that is connected to the server system. Accordingly, no information concerning the database (i.e. data or metadata) exists on the server system. The system that is connected to the server system is oftentimes more reliable than the server system in terms of data accessibility, therefore since no metadata exists on the server system, data is capable of being accessed in a more reliable fashion.

DETAILED DESCRIPTION

Figure 1:
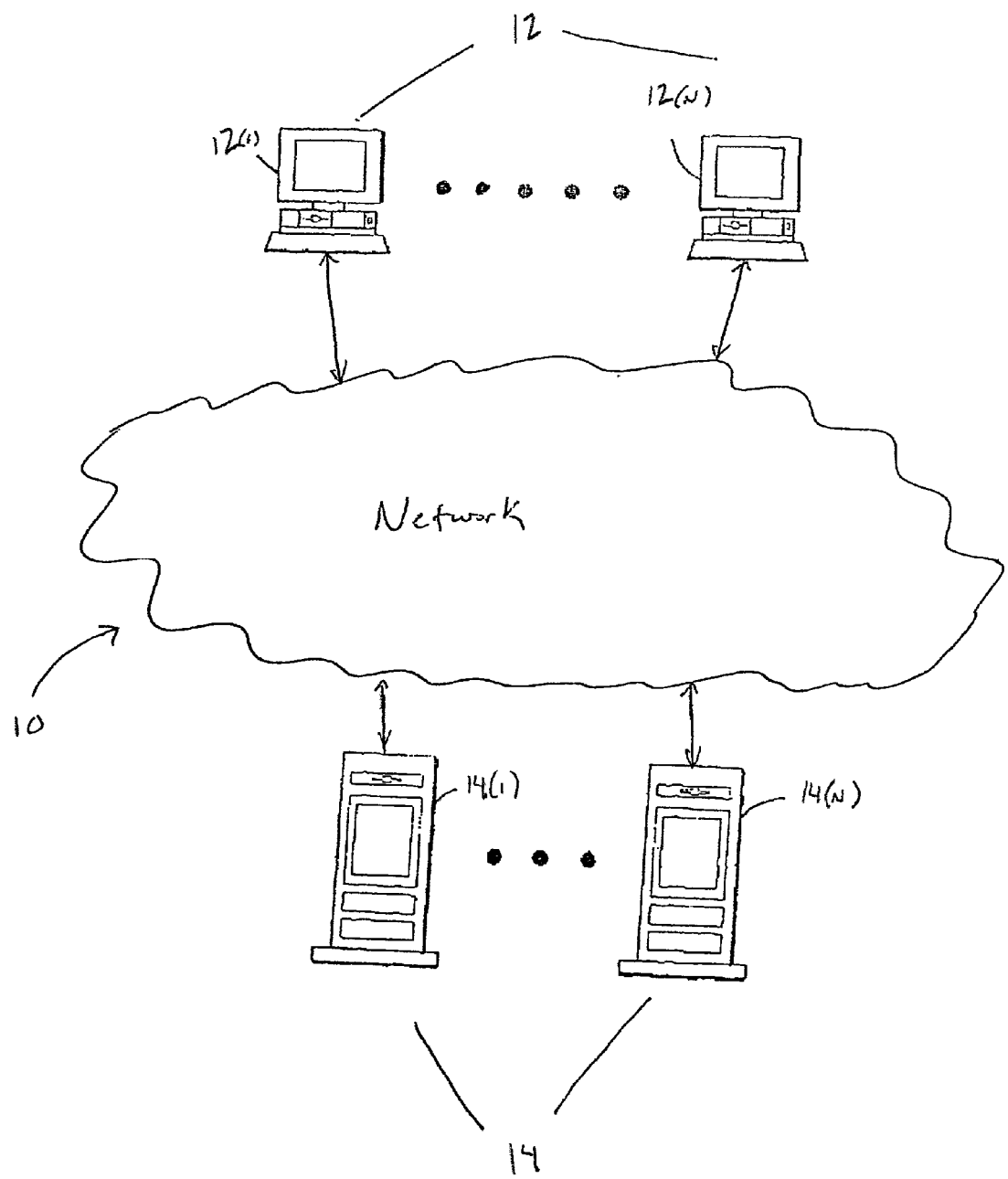
FIG. 1 is an illustration of a typical Internet environment.

The present invention relates to a method and system for accessing information on a network. The following description is presented to enable one of ordinary skill in the art to make and use the invention and is provided in the context of a patent application and its requirements. Although the present invention has been described in the context of being used with the Internet, one of ordinary skill in the art will readily recognize that the present system can be used in conjunction with any type of networking system while remaining within the spirit and scope of the present invention. Accordingly, various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention is presented in the context of a preferred embodiment. The preferred embodiment of the present invention is a method and system for accessing information over a network such as the Internet. The present invention implements a Network Database Management System (NDMS) that responds to all incoming requests and does database related functions (create tables, authenticate users, etc.) based on metadata and data stored on a client machine in a remote file system. Accordingly, the more traditional functionality of the server database, which is a data storage and access facility, is provided on client machine. Therefore the server database only acts on data that it is provided access to on client machine which is connected to the server database.

Such a method may be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for booting up a computer system in a secure fashion.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Figure 2:
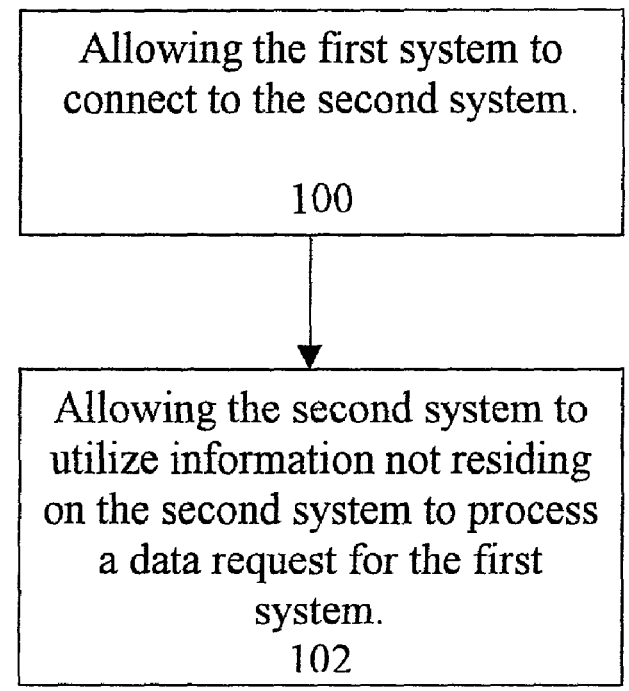
FIG. 2 is a high level flowchart of the method in accordance with the present invention.

For a better understanding of the method in accordance with the present invention, please refer now to FIG. 2. FIG. 2 is a high level flowchart of the method in accordance with the present invention. First, a first system is allowed to connect to a second system, via step 100. Next, the second system utilizes information not residing on the second system to process a data request on the client machine, via step 102. Preferably, the first system comprises a client machine, the second system comprises a server machine and, the information comprises metadata about objects such as tables, users, triggers, indexes, etc.

Figure 3:
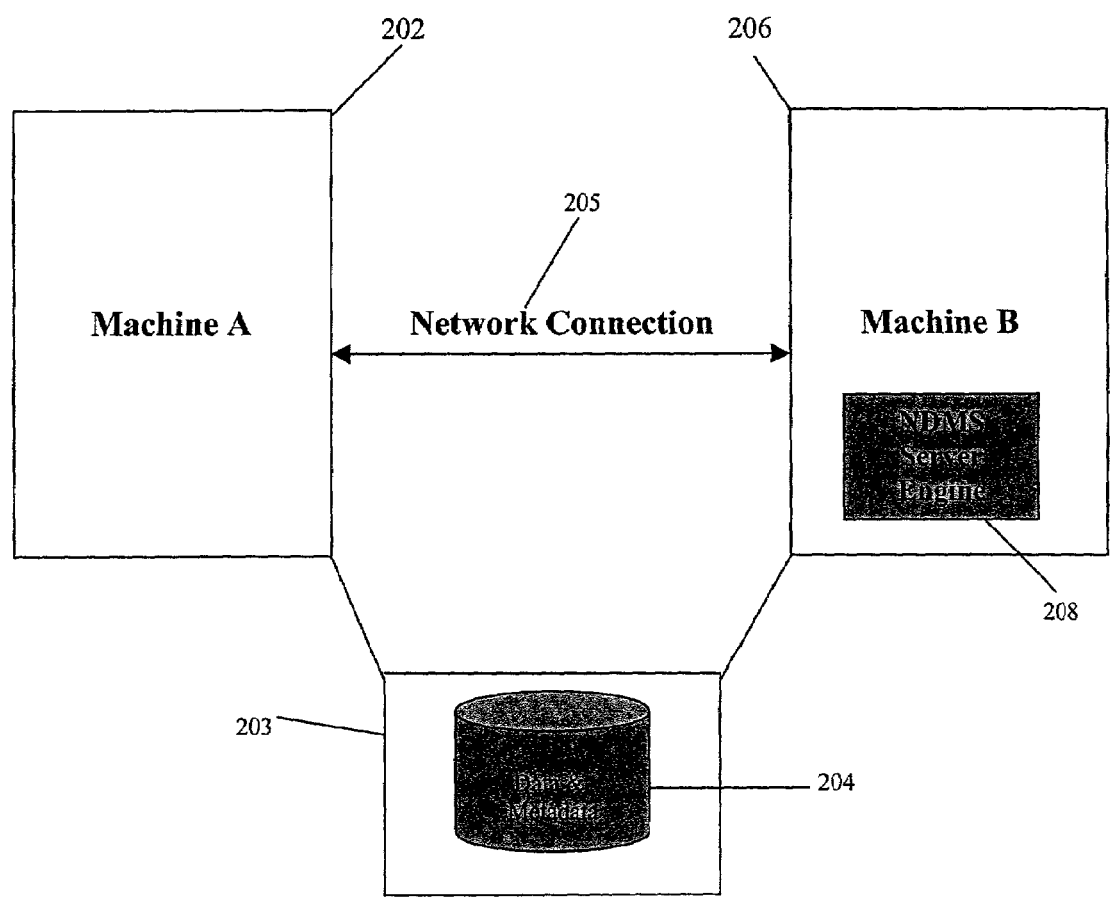
FIG. 3 illustrates a network database management system in accordance with the present invention.

Please refer now to FIG. 3. FIG. 3 is an illustration of a preferred embodiment of a network database management system 200 in accordance with the present invention. The network database management system 200 comprises a client machine 202 and a server machine 206 wherein the server machine 206 includes a server engine 208. Data and metadata 204 are maintained in a separate storage area 203. In an alternate embodiment, the data and metadata 204 could reside within the client machine 202. In either case, because the server machine 206 does not include the data or the metadata the server machine 206 behaves strictly as a database processing engine. The client machine 202 and the server machine 206 are connected via a network connection 205.

Figure 4:
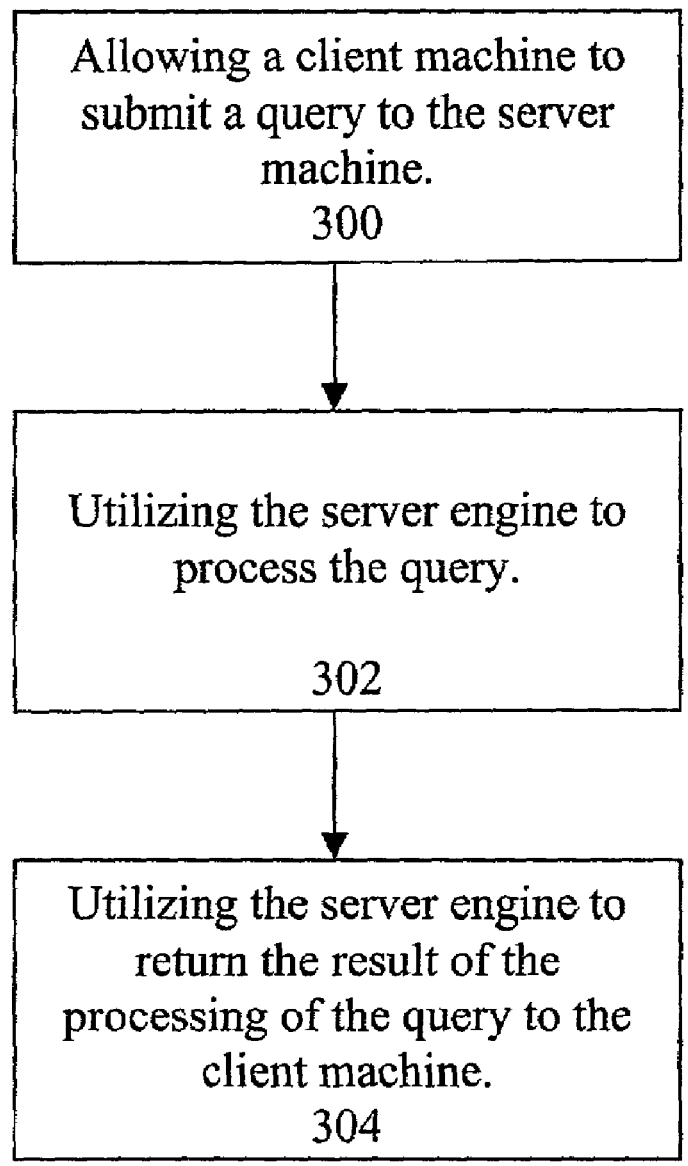
FIG. 4 is a more detailed flowchart of the method in accordance with the present invention.

To better understand the operation of the present invention, please refer now to FIG. 4. FIG. 4 is a more detailed flowchart of the method in accordance with the present invention. First, a client machine 202 submits a query to the server machine 206, via step 300. Preferably, a first internet protocol is utilized by the client machine 202 to submit the query. If the data and metadata reside on the client machine 202, the query preferably includes data and metadata 204, along with a request to perform an operation on the data and metadata 204. Alternatively, if the data and metadata 204 do not reside on the client machine 202, the query preferably includes a pointer to the data and metadata 204, along with a request to perform an operation on the data and metadata 204. Next, the server engine 208 processes the query, via step 302. The processing of the query comprises the server engine 208 performing the requested operation on the data and metadata 204. Preferably, the server engine 208 implements a second internet protocol to process the query. Finally, the server engine 208 returns the result of the processing of the query to the client machine 202, via step 304. Accordingly, the server engine 208 does not store any data or metadata, but simply uses the data and metadata 204 that reside on the client machine 202 to process the query.

Although the method and system in accordance with the present invention is disclosed in the context of being utilized with Internet protocols, one of ordinary skill in the art will readily recognize that a variety of protocols could be employed while remaining within the spirit and scope of the present invention.

The benefits of the utilization of the method and system in accordance with the present invention include, but are not limited to, scalability, availability, local access to results sets, and the utilization of local disk space as opposed the utilization of a server database.

Scalability

Because no information (i.e. metadata) about existing databases is maintained by the server machine 206 and requests for information do not need to be handled by a particular server, many of the scalability techniques that have been designed for web servers can be employed by utilizing the NDMS in accordance with the present invention which can accordingly handle millions of databases and users simultaneously.

Availability

As before mentioned, currently, server application developers are required to purchase a database in order to test and develop their database applications. They must also license a copy of the database engine in order to distribute their code with a database functionality. By storing data and metadata on a client machine as opposed to a server machine, a developer would not need to install a database or include database code along with their server applications. Therefore, a substantial reduction in the amount of required application code is achieved. This especially advantageous for mobile computing systems such as hand held devices.

Local Access to Result Sets

In accordance with the present invention, all result sets are returned to the client machine 202. The client machine can subsequently utilize the metadata on the client machine to process the data. This eliminates any possible data integrity problems that could result from the occurrence of a network failure during data processing.

Take Advantage of Local Disk Space

Sometimes the client machine will have better access times and higher reliability than the traditional RDBMS. By taking the storage of both metadata and data away from the server database, users have control over their data and can enhance their machine capabilities without interfering with other users.

There are potentially many different ways to implement this concept, some of which could require new protocols. At a minimum, methods for remote file system access from remote machines and extensions to database connection protocols such as Open Database Connectivity (ODBC) could be utilized.

Through the use of the method and system in accordance with the present invention, the more traditional function of the server database which is a data storage and access facility is provided on the client system and the server system only acts on data that it is provided access to on client system that is connected to the server system. Accordingly, no data concerning the database (i.e. metadata) exists on the server system. The client system is oftentimes more reliable than the server system in terms data accessibility, therefore since no metadata exists on the server system, data is capable of being accessed in a more reliable fashion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the presented application.

What is claimed is:

1. A method for processing a query, the method comprising:

receiving from a first computer system a request to process a query at a second computer system, the request to process the query comprising a first object data and metadata about the first object data, and the query further comprising a request to perform an operation on the first object data and metadata at the second computer system, the first computer system comprising a database to store object data including the first object data;

the second computer system processing the query with a database processing engine including performing the operation on the first object data and the metadata to generate a result for the query, the first object data and the metadata not having been stored on the second computer system prior to the second computer system receiving the request to process the query, the result based solely on the first object data and metadata within the request; and the second computer system returning the result of the query to the first computer system.

2. The method of claim 1, wherein the second computer system is in communication with the first computer system through a network.

3. The method of claim 2, wherein the network comprises the Internet.

4. The method of claim 3, wherein:

the second computer system receives the request to process the query from the first computer system in accordance with a first Internet protocol; and the second computer system processes the query in accordance with a second Internet protocol.

5. The method of claim 1, wherein the first computer system comprises a client machine and the second computer system comprises a server machine.

6. The method of claim 1, wherein the metadata comprises information about objects.

7. The method of claim 6, wherein the objects comprise one or more objects selected from the group consisting of tables, triggers and indexes.

8. The method of claim 1, wherein the processing includes creating tables.

9. The method of claim 1, wherein the processing includes authenticating users.

10. The method of claim 1, wherein the second computer system comprises a hand-held server device.

11. A method for processing a query, the method comprising:

receiving from a first computer system a request to process a query at a second computer system, the request to process the query comprising a pointer to a first object data and metadata about the first object data, the pointer referring to a database on a third computer system, and the query further comprising a request to perform an operation on the first object data and metadata at the second computer system;

the second computer system processing the query with a database processing engine including performing the operation on the first object data and the metadata to generate a result for the query, the first object data and the metadata not having been stored on the second computer system prior to the second computer system receiving the request to process the query, the result based solely on the first object data and metadata; and the second computer system returning the result of the query to the first computer system.

12. A method for processing a query, the method comprising:

receiving from a client a request to process a query at a the hand-held server device, the request to process the query comprising a first object data and metadata about the first object data, and the query further comprising a request to perform an operation on the first object data and metadata at the hand-held server device, the client comprising a database to store object data including the first object data and the hand-held server device not including a database to store object data;

the hand-held server device processing the query using a database engine including performing the operation on the first object data and the metadata to generate a result for the query, the first object data and the metadata not having been stored on the hand-held server device prior to the server receiving the request to process the query, the result based solely on the first object data and metadata within the request;

the hand-held server device receiving the request to process the query from the client computer system in accordance with a first Internet protocol, and processing the query in accordance with a second Internet protocol; and the hand-held server device returning the result of the query to the client, wherein the client is more reliable than the hand-held server device.

* * * * *